March 12, 1963  J. W. McQUAID  3,080,759
SAMPLING DEVICE
Filed Dec. 19, 1958

John W. McQuaid   Inventor

By W. O. T Heilman

Attorney

3,080,759
SAMPLING DEVICE

John William McQuaid, East Baton Rouge, La., assignor to Esso Research and Engineering Company, a corporation of Delaware
Filed Dec. 19, 1958, Ser. No. 781,774
2 Claims. (Cl. 73—422)

The present invention relates to an improved sample introduction valve for use in introducing gas or liquid samples into gas chromatographs, mass spectrometers and similar analyzing devices. The present valve is particularly advantageous in that uniform composition samples can be obtained even of liquids having high vapor pressure characteristics.

In order to establish material balances and to determine material percents, e.g. the $C_{9+}$ material in a gas stream by gas chromatography, samples of uniform or equal volumes are essential. The valve according to the present invention accomplishes the required sample uniformity not previously attained with conventional sampling equipment.

Figure 1:
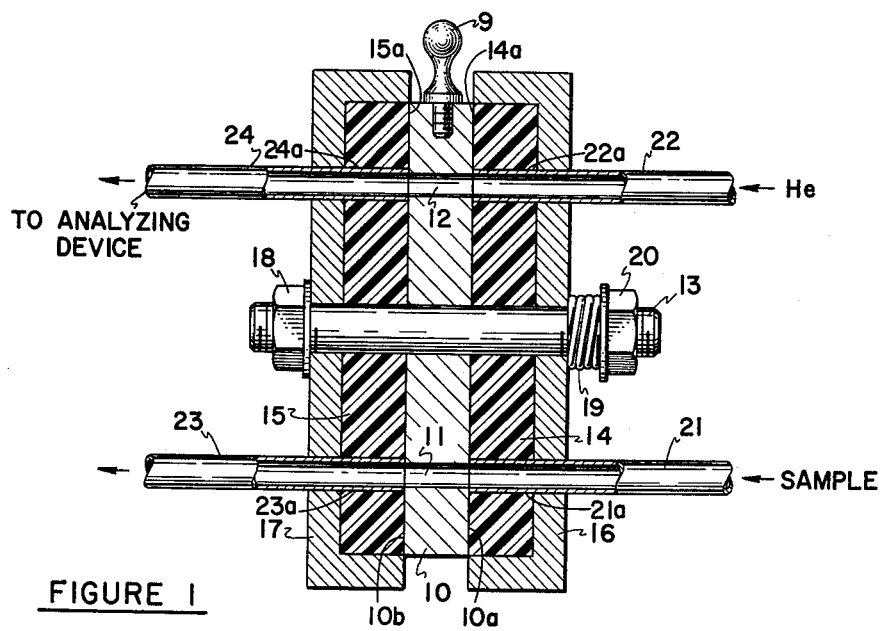
Figure 2:
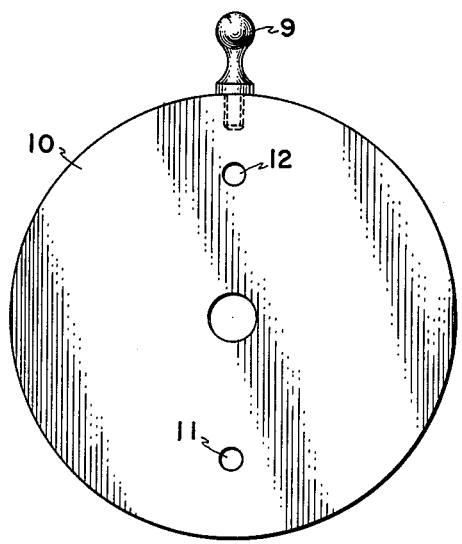

The present invention will be more easily understood from a consideration of the following drawings of which FIGURE 1 is a side view in section of the valve sampling device of this invention, and FIGURE 2 is an end view of the central rotatable disc only, of the sampling device.

In the drawings above briefly described, a preferred structure has been illustrated, and while this structure will be specifically explained, it is to be understood that minor variations may be made within the scope of the invention as claimed.

In the sampling device illustrated, a disc 10 is mounted concentrically on a shaft 13, for rotation thereon by means such as the knob 9. A pair of flow passageways 11 and 12 are defined in the disc, in substantially parallel relation to each other and to the shaft 13, so as to open through opposite face portions 10a and 10b of the disc 10. The passageways 11 and 12, as shown, are also disposed in equally spaced relation radially from the shaft axis, along a diameter of the disc.

Also mounted on the shaft 13, concentrically therewith, are a pair of seal plates 14 and 15, having face portions 14a and 15a respectively adapted for a sealing surface relationship to the respective face portions 10a and 10b of the disc 10. As shown in the drawings each of the seal plates 14 and 15 defines a pair of passageways designated by the numerals 21a and 22a in the seal plate 14, and by the numerals 23a and 24a in the seal plate 15. The paired passageways are disposed in aligned relation along a diameter of the plate in which contained, and radially spaced with reference to the axis of shaft 13 by a distance equal to the spaced relation of the passageways 11 and 12 thereto. As mounted on the shaft 13, the seal plates 14 and 15 are disposed so as to bring the respective passageways in each plate into axial alignment with a corresponding passageway in the other plate.

The numerals 16 and 17 designate the respective elements of a pair of rimmed receivers or housing members, also mounted concentrically with the shaft 13, and adapted to receive the respective seal plates 14 and 15 contained within the respective plate rims so as to expose one face portion of each plate. The receivers 16 and 17 also define passageways corresponding to those in the respective seal plates, and disposed for axial alignment therewith.

In assembling the device, as illustrated, the disc 10 is disposed on the shaft 13 between the respective seal plates and their receiver members, with the exposed face portions of the seal plates in sealing surface engagement with the respective surface portions 10a and 10b of the disc 10. Sealing engagement between the several surface portions is provided by compression between the nuts 18 and 20, threaded on the ends of the shaft 13 so as to engage the outer surfaces of the respective receivers 17 and 16. A spring element 19 disposed between the nut 20 and receiver 16 facilitates rotation of the disc 10 between the seal plates by providing a resilient spring-loaded relationship.

The respective aligned passageways of the receiver 16 and plate 14 each is adapted to permit insertion of one of a pair of inlet conduits 21 and 22, while the respective aligned passageways of the receiver 17 and plate 15 each is adapted to permit insertion of one of a pair of outlet conduits 23 and 24. Preferably the innermost ends of the inserted conduits terminate in flush relation to a disc-engaging seal plate surface.

When thus assembled, and with the respective conduits held in a fixed position, the receivers, plates, and shaft are secured against rotation. The disc then may be rotated on the shaft so as to selectively place the passageways 10a and 10b in or out of communication with the conduits. The passageways 11 and 12 constitute sample chambers which may be filled and emptied by suitable, selective alignment with the respective conduits. Volume of the sample is determined by the diameter of the passageways 11 and 12 and/or the thickness of the disc 10. Also, although only one pair of sample-receiving chambers and cooperating inlet and outlet conduits are shown for the purpose of illustration, obviously a single device may be modified to provide any desired number of chambers for successive or simultaneous filling and evacuation.

Turning now to the operation of the present device, the sample of liquid or gas, is withdrawn usually from a line such as the product line of the unit by the following procedure. A by-pass line containing the present sampling device is provided on the main line. This by-pass line is opened during sampling or remains continuously open and the material of which a sample is to be taken flows through the by-pass line providing a stream representative of the main stream of material. Thus a continuous flow of material is provided through line 21, flow passageway 11 in disc 10 and thence through line 23. A sample is taken from this flow of material by rotating disc 10 using handle 9 so as to trap a fixed volume of material within the cylindrical opening in said disc. This trapped sample is then released when upon further turning of the disc the opening is aligned with line 22 and with line 24. When this alignment is attained, helium is then supplied under pressure to line 22 forcing the sample through line 24 to the analyzing device such as the gas chromatograph.

The housing members 16 and 17 may be of any rigid, strong material such as, for example, stainless steel. They serve only for forcing the seal plates 14 and 15 tightly against the disc 10. Seal plates 14 and 15 are preferably of Teflon or some other self lubricating material. Teflon is a trade name for tetrafluoroethylene resin. This material is self lubricating and provides a good seal against the metal disc 10. This disc may be of brass or of any other metal or material machinable to a very smooth surface. The Teflon also should be machined to a very smooth surface to prevent leakage, especially where gases such as helium are used, or in case vacuum techniques for withdrawal of samples are employed. A vacuum transferal of the trapped sample may be accomplished by blocking off line 22 and applying a vacuum to line 24.

In another preferred embodiment of the present device the disc may be machined so that O rings of rubber or other suitable material may be positioned on each face of the disc around the flow passageways and only slightly larger in diameter than said openings so as to give a better seal with the Teflon. This embodiment is less desirable where constant volume samples are required since the sample volume extends to the O ring and this volume changes from sample to sample due to the compressibility of the rubber during rotating of the disc or to other factors. It is, of course, contemplated that alternatively special machining of the Teflon seal plates or separate additional Teflon rings mounted on the Teflon plates may be used to overcome these difficulties, and obtain both a complete seal and constant volume samples. The lines for introducing and withdrawing the samples may, of course, be of any material impervious to the materials being tested, such as stainless steel or copper tubing.

The present sampling device is particularly advantageously used with gas chromatography analyzers. These analyzers obtain a method of separation based on selective sorption and desorption. Thus the helium passed into line 22 picks up the sample and carries it through line 24 to a gas chromatography column packed with a material consisting of silicone oil on pulverized fire brick. This column and the entering sample are maintained at a constant temperature. The helium which continually is supplied to the column carries the sample upward and the selective sorption and desorption occurring causes the lighter hydrocarbons to pass out from the column first. The hydrocarbons passing from the column are measured by the changing thermal conductivity of the effluent stream. Generally, one component completely passes out from the column before the next heavier component begins to appear. Thus the area under the curve in the plot of conductivity vs. time above the base reading for helium is proportional to the amount of the particular component present. (The particular component being identified by the length of time it takes for it to pass through the column and show on the chart.) Another particularly advantageous use of the present invention device is in connection with gas chromatographic analysis, wherein it is desired to measure the heavier components such as $C_{9+}$ materials present in a gaseous or liquid stream. These $C_{9+}$ materials take so long to leave the column and show as such a low peak persisting for a long period that they are difficultly measured. By having the exact measure of the volume of the sample taken provided by the present invention device a material balance can be used to determine by difference the amount of these heavy components present so that a total analysis of the stream can be made.

Following is presented the experimental results obtained in testing a valve of the type shown in the drawings.

*Example I*

It can be seen from the following data obtained in a gas chromatograph analyzer on single component samples taken in the liquid phase that equal size samples are obtained.

|  | Isopentane | 3-Methyl Butene-1 | Cis-Butene-2 |
| --- | --- | --- | --- |
| Boiling Point (° C.) | 28.0 | 20.1 | 3.7 |
| No. of Runs | 6 | 10 | 11 |
| Average Peak Height | 245.6 | 231.7 | 245.7 |
| 95% Confidence Limits | ±1.6 (0.67%) | ±1.4 (0.62%) | ±0.37 (0.15%) |

Since average peak height is proportional to the area under the curve for a single component sample it can be seen that precise reproducibility or accuracy is obtained. This precision considering the volatility of the liquids used, is excellent.

*Example II*

Data were taken also by gas chromatography on a typical hydroformate sample in order to compare the performance of the present liquid sampling valve with that of a conventional pipet introduction system. The following data on average concentrations and 95% confidence limits were obtained:

| Compound | Average Concentration (Liq. Vol. percent) | 95% Confidence Limits | |
| --- | --- | --- | --- |
| | | Pipet System (10 Runs) | Liquid Sampling (28 Runs) |
| Propane | 0.87 | ±0.09 (10.5%) | ±0.05 (5.5%) |
| i-Butane | 1.80 | ±0.17 (9.2%) | ±0.04 (2.3%) |
| n-Butane | 2.65 | ±0.19 (1.1%) | ±0.08 (3.1%) |
| i-Pentane | 5.43 | ±0.15 (2.7%) | ±0.06 (1.2%) |
| n-Pentane | 3.90 | ±0.22 (5.6%) | ±0.11 (2.8%) |

The percent values in parenthesis refer to the percent variation from the actual average amount. From this data it can be seen that generally at least twice the precision is obtained by the present liquid sampling valve as compared to the conventional method of pipet introduction.

It should be noted that the present invention valve sampling device is particularly adapted for use in continuously intermittent sampling. Thus by locating the flow passageways in the rotatable disc at 180° from each other, both the by-pass sample line from the main line of the processing unit from which samples are to be taken and the helium line can be left open during the time when a sample is not being taken and samples can be taken automatically merely by rotating the valve 180° each time. It is, of course, contemplated that more than two openings in the rotatable disc may be used and that these may be different diameter so that different size samples depending upon the particular analysis to be made on the sample may be obtained.

What is claimed is:

1. A sampling device comprising (1) a shaft having threaded ends, (2) a disc mounted concentrically and rotatably on said shaft, said disc having defined therein at least one flow passageway offset radially from the shaft axis, and substantially parallel to said axis, (3) a pair of seal plates mounted concentrically on said shaft one on either side of said disc with the surface portions of said plates immediately adjacent those of said disc in sealing engagement therewith, each of said seal plates having defined therein a pair of passageways each substantially parallel to the axis of said shaft and each offset radially from said axis at a distance equal to that at which the passageway through said disc is offset therefrom, and the pairs of passageways in said seal plates being in alignment from plate to plate, (4) a pair of rimmed receivers mounted concentrically on said shaft one on either side of said pair of seal plates, each one of said rimmed receivers at least partially enclosing the seal plate immediately adjacent thereto but not enclosing the surface portion of that seal plate in sealing engagement with said disc, and each one of said rimmed receivers having defined therein a pair of passageways each substantially parallel to the axis of said shaft and offset radially from said axis at a distance equal to that at which the passageway through said disc is offset therefrom and each passageway through each rimmed receiver being in alignment with a passageway through the seal plate which that rimmed receiver at least partially encloses, (5) a conduit member fitted in and extending through each passageway in each of said rimmed receivers and likewise fitted in and extending at least part way through the aligned passageway in the immediately adjacent seal plate but not extending beyond the surface portion of that seal plate immediately adjacent said disc, each conduit member serving to prevent relative rotary motion about said shaft between the rimmed receiver and the seal plate wherein it is fitted, (6) a compression spring element on said shaft beyond a first one of the rimmed receivers, (7) a first nut threaded onto one end of said shaft and in solid contact with the exposed surface of a second one of said rimmed receivers, (8) a second nut threaded onto the other end of said shaft to bear against said spring element and compress the same against said first one of the rimmed receivers, and so compress the axial array of said rimmed receivers, said seal plates, and said disc against said first nut and the members of said array one against another, and (9) means for rotating said disc on said shaft with respect to said seal plates.

2. An improved sampling device as in claim 1 wherein the surface of the said seal plates in contact with said rotatable disc are made of Teflon.

References Cited in the file of this patent

UNITED STATES PATENTS

| | | |
|---|---|---|
| 567,200 | Senna | Sept. 8, 1896 |
| 2,757,541 | Watson et al. | Aug. 7, 1956 |